US010944566B2

(12) United States Patent
Harnik (10) Patent No.: US 10,944,566 B2
(45) Date of Patent: Mar. 9, 2021

(54) METHODS AND SYSTEMS FOR SUPPORTING FAIRNESS IN SECURE COMPUTATIONS

(71) Applicant: International Business Machines Corporation, Armonk, NY (US)

(72) Inventor: Danny Harnik, Tel Mond (IL)

(73) Assignee: International Business Machines Corporation, Armonk, NY (US)

( * ) Notice: Subject to any disclaimer, the term of this patent is extended or adjusted under 35 U.S.C. 154(b) by 313 days.

(21) Appl. No.: 15/813,225

(22) Filed: Nov. 15, 2017

(65) Prior Publication Data

US 2019/0149333 A1 May 16, 2019

(51) Int. Cl.
*H04L 9/32* (2006.01)

(52) U.S. Cl.
CPC .......... *H04L 9/3234* (2013.01); *H04L 9/3239* (2013.01); *H04L 9/3247* (2013.01); *H04L 2209/26* (2013.01); *H04L 2209/38* (2013.01); *H04L 2209/46* (2013.01)

(58) Field of Classification Search
CPC ... H04L 9/3234; H04L 9/3239; H04L 9/3247; H04L 2209/26; H04L 2209/38; H04L 2209/46
See application file for complete search history.

(56) References Cited

U.S. PATENT DOCUMENTS

| | | | |
|---|---|---|---|
| 8,527,765 | B2 | 9/2013 | Veugen et al. |
| 9,367,697 | B1* | 6/2016 | Roth ..................... G06F 21/602 |
| 9,544,284 | B1 | 1/2017 | Dooley et al. |
| 9,774,578 | B1* | 9/2017 | Ateniese ............... G06F 3/0619 |
| 2012/0166818 | A1* | 6/2012 | Orsini ..................... H04L 9/085 713/193 |
| 2013/0314249 | A1* | 11/2013 | Le Buhan ............. G01D 4/002 340/870.02 |

(Continued)

OTHER PUBLICATIONS

Herzberg et al., "Oblivious and Fair Server-Aided Two-Party Computation", Preprint submitted to Elsevier journal Information Security Technical Report, Oct. 11, 2012.
Pass et al., "Formal Abstractions for Attested Execution Secure Processors", Eurocrypt 2-17, Part 1, LNCS 20210, 2017, pp. 260-289.
Cleve, "Limits on the Security of Coin Flips When Half the Processors are Faulty", Proceeding STOC '86 Proceedings of the eighteenth annual ACM symposium on Theory of computing, 1986, pp. 364-369.

(Continued)

*Primary Examiner* — Ali S Abyaneh
*Assistant Examiner* — Zoha Piyadehghibi Tafaghodi
(74) *Attorney, Agent, or Firm* — Ziv Glazberg (57) ABSTRACT

A computer-implemented method, computerized apparatus and computer program product for supporting fairness in secure computations. A trusted execution platform with remote attestation ("enclave") is provided to each of a plurality of participants. An authenticated public ledger accessible by all participants is also provided. Each of the enclaves is configured for obtaining at least a portion of an input to a function for computing a joint secret output, complementing the input by obtaining any remainder portion(s) thereof from one or more other enclaves, and, responsive to obtaining an indication from the ledger that the output can be computed by each of the enclaves, providing to the owner participant the output computed using the function and input. At least one of the enclaves is further configured for providing the indication to the ledger responsive to obtaining knowledge that the output can be computed by each of the enclaves.

19 Claims, 4 Drawing Sheets

(56) References Cited

U.S. PATENT DOCUMENTS

| | | | |
|---|---|---|---|
| 2015/0121066 A1* | 4/2015 | Nix | H04W 4/70 |
| | | | 713/155 |
| 2015/0143125 A1* | 5/2015 | Nix | H04W 4/70 |
| | | | 713/171 |
| 2016/0191494 A1* | 6/2016 | Claes | H04L 63/0853 |
| | | | 713/159 |
| 2016/0283411 A1 | 9/2016 | Sheller et al. | |
| 2016/0350534 A1* | 12/2016 | Poornachandran | G06F 21/57 |
| 2016/0366185 A1* | 12/2016 | Lee | H04L 63/20 |
| 2017/0046693 A1* | 2/2017 | Haldenby | G06Q 20/0655 |
| 2017/0149796 A1* | 5/2017 | Gvili | H04L 9/085 |
| 2017/0187536 A1* | 6/2017 | Meriac | G06F 16/9566 |
| 2017/0244568 A1* | 8/2017 | Brickell | H04L 63/061 |
| 2017/0251025 A1* | 8/2017 | Varley | H04L 9/088 |
| 2017/0302640 A1* | 10/2017 | Maletsky | H04L 9/3247 |

OTHER PUBLICATIONS

Ben-Or et al., "Completeness Theorems for Non-Cryptographic Fault-Tolerant Distributed Computation", Proceeding STOC '88 Proceedings of the twentieth annual ACM symposium on Theory of computing, 1988, pp. 1-10.

Hoekstra, "Intel® SGX for Dummies (Intel® SGX Design Objectives)", Nov. 30, 2015. available at: https://software.intel.com/en-us/blogs/2013/09/26/protecting-application-secrets-with-intel-sgx.

Pass et al., "Formal Abstractions for Attested Execution Secure Processors", Cryptology ePrint Archive, 2017.

* cited by examiner

METHODS AND SYSTEMS FOR SUPPORTING FAIRNESS IN SECURE COMPUTATIONS

TECHNICAL FIELD

The present disclosure relates to digital cryptography in general, and to techniques and mechanisms for supporting fairness in secure computations, in particular.

BACKGROUND

In secure two-party (or multi-party) computation, the term fairness refers to the property that the two or more parties are all guaranteed to receive the same output. More precisely, in a protocol where messages are exchanged, if one party learns the secret before the other does, it can abort the remaining messages in the protocol and hence gain an advantage over the other party. Such fairness in secure computations is a key enabler for various practical applications, such as auctions, bidding, voting, online transactions, and the like. For example, such a mechanism can be used to avoid a scenario in which a payment for a service is fulfilled but the service is not provided, or vice versa, the service is delivered but the payment is not carried out. It is a long known fact that unless there is an honest majority (strict majority) of the parties that is guaranteed not to abort, general fairness (for any given joint function) cannot be achieved.

A famous impossibility result as presented in: R. Cleve, "Limits on the security of coin flips when half the processors are faulty." In Proc. of the 18th STOC, pages 364-369, 1986, which is hereby incorporated by reference in its entirety without giving rise to disavowment, states that in a two-party setting with m rounds, in any coin flipping protocol one of the parties can bias the output of the coin by at least 1/m (this was also shown to be a tight bound).

One known way to achieve fairness is to have a trusted third party mediate between the parties. Another is to have a strict majority of honest players, as discussed in: M Ben-Or, S Goldwasser, A Wigderson. "Completeness theorems for non-cryptographic fault-tolerant distributed computation" STOC '88 Proceedings of the twentieth annual ACM symposium on Theory of computing Pages 1-10, Chicago, Ill., USA—May 2-4, 1988, which is hereby incorporated by reference in its entirety without giving rise to disavowment.

BRIEF SUMMARY

One exemplary embodiment of the disclosed subject matter is a computer-implemented method comprising: providing to each of a plurality of participants $P_i$ where $i=1, \ldots, n$ for $n>1$, an access to a trusted execution platform with remote attestation $E_i$, each of which trusted execution platforms being configured to securely compute a function for extraction of a shared secret output, the function admitting input separable into a plurality of disjoint portions $\{A_1, \ldots, A_m\}$ where $1<m \leq n$; and, providing to the plurality of participants access to an authenticated public ledger wherein data written thereto cannot be modified thereafter, and wherein data read therefrom is verifiable with respect to being originated therein; wherein each trusted execution platform $E_i$ is further configured to perform the steps of: obtaining a subset $\{A_{i1}, \ldots, A_{ik}\}$ of the plurality of disjoint portions $\{A_1, \ldots, A_m\}$ of input to the function, the subset being non-empty; obtaining a complementary subset consisted of the remaining portion or portions $\{A_1, \ldots, A_m\} \backslash \{A_{i1}, \ldots, A_{ik}\}$ of input to the function from one or more of the other trusted execution platforms $\{E_j\}_{j \neq i}$, whereby extraction of the secret output S can be effected by means of applying the function on the plurality of input portions $\{A_1, \ldots, A_m\}$ obtained; and, responsive to obtaining and verifying an indication from the authenticated public ledger that extraction of the secret output S can be effected by each of the trusted execution platforms $\{E_i\}_{i=1, \ldots, n}$, providing the extracted secret output S to respective participant $P_i$; wherein at least one of the trusted execution platforms $\{E_i\}_{i=1, \ldots, n}$ is further configured to provide the indication to the authenticated public ledger responsive to obtaining knowledge that extraction of the secret output S can be effected by each of the trusted execution platforms $\{E_i\}_{i=1, \ldots, n}$.

Another exemplary embodiment of the disclosed subject matter is a computerized apparatus having a processor, the processor being adapted to perform the steps of: providing to each of a plurality of participants $P_i$ where $i=1, \ldots, n$ for $n>1$, an access to a trusted execution platform with remote attestation $E_i$, each of which trusted execution platforms being configured to securely compute a function for extraction of a shared secret output, the function admitting input separable into a plurality of disjoint portions $\{A_1, \ldots, A_m\}$ where $1<m \leq n$; and, providing to the plurality of participants access to an authenticated public ledger wherein data written thereto cannot be modified thereafter, and wherein data read therefrom is verifiable with respect to being originated therein; wherein each trusted execution platform $E_i$ is further configured to perform the steps of: obtaining a subset $\{A_{i1}, \ldots, A_{ik}\}$ of the plurality of disjoint portions $\{A_1, \ldots, A_m\}$ of input to the function, the subset being non-empty; obtaining a complementary subset consisted of the remaining portion or portions $\{A_1, \ldots, A_m\} \backslash \{A_{i1}, \ldots, A_{ik}\}$ of input to the function from one or more of the other trusted execution platforms $\{E_j\}_{j \neq i}$, whereby extraction of the secret output S can be effected by means of applying the function on the plurality of input portions $\{A_1, \ldots, A_m\}$ obtained; and, responsive to obtaining and verifying an indication from the authenticated public ledger that extraction of the secret output S can be effected by each of the trusted execution platforms $\{E_i\}_{i=1, \ldots, n}$, providing the extracted secret output S to respective participant $P_i$; wherein at least one of the trusted execution platforms $\{E_i\}_{i=1, \ldots, n}$ is further configured to provide the indication to the authenticated public ledger responsive to obtaining knowledge that extraction of the secret output S can be effected by each of the trusted execution platforms $\{E_i\}_{i=1, \ldots, n}$.

Yet another exemplary embodiment of the disclosed subject matter is a computer program product comprising a non-transitory computer readable storage medium retaining program instructions, which program instructions when read by a processor, cause the processor to perform a method comprising: providing to each of a plurality of participants $P_i$ where $i=1, \ldots, n$ for $n>1$, an access to a trusted execution platform with remote attestation $E_i$, each of which trusted execution platforms being configured to securely compute a function for extraction of a shared secret output, the function admitting input separable into a plurality of disjoint portions $\{A_1, \ldots, A_m\}$ where $1<m \leq n$; and, providing to the plurality of participants access to an authenticated public ledger wherein data written thereto cannot be modified thereafter, and wherein data read therefrom is verifiable with respect to being originated therein; wherein each trusted execution platform $E_i$ is further configured to perform the steps of:

obtaining a subset $\{A_{i1}, \ldots, A_{ik}\}$ of the plurality of disjoint portions $\{A_1, \ldots, A_m\}$ of input to the function, the subset being non-empty; obtaining a complementary subset consisted of the remaining portion or portions $\{A_1, \ldots, A_m\}\setminus\{A_{i1}, \ldots, A_{ik}\}$ of input to the function from one or more of the other trusted execution platforms $\{E_j\}_{j\neq i}$, whereby extraction of the secret output S can be effected by means of applying the function on the plurality of input portions $\{A_1, \ldots, A_m\}$ obtained; and, responsive to obtaining and verifying an indication from the authenticated public ledger that extraction of the secret output S can be effected by each of the trusted execution platforms $\{E_i\}_{i=1, \ldots, n}$, providing the extracted secret output S to respective participant $P_i$; wherein at least one of the trusted execution platforms $\{E_i\}_{i\times 1, \ldots, n}$ is further configured to provide the indication to the authenticated public ledger responsive to obtaining knowledge that extraction of the secret output S can be effected by each of the trusted execution platforms $\{E_i\}_{i=1, \ldots, n}$.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One recent paradigm in computation is that of trusted execution platforms with remote attestation, such as Intel® Software Guard Extension (Intel® SGX). In such mechanisms, certain regions of code and data of a computer program may be executed in a secured region in memory (also called "enclave"), in a way that all of the memory may be encrypted on the fly. In this way, an owner of the machine, or even of the code itself, cannot infer the data being processed in the enclave. In addition, the trusted execution platform, such as the Intel® SGX processor, may support a remote attestation process which guarantees that a specific agreed upon code is indeed executed in the enclave. As can be readily noted by a person skilled in the art, while a malicious party cannot tamper with the code in the enclave or learn about the data inside, such party can however control the network and storage connections of the enclave.

Another recent computation paradigm is that of an authenticated public ledger, such as the infrastructure commonly known as "Blockchain". The concept of Blockchain was introduced in 2008 by Satoshi Nakamoto, a pseudonym of an entity that also introduced the digital currency Bitcoin which uses it as a core component. This concept generally relates to a public medium where parties can post messages or data, and once posted, this data cannot be deleted or augmented. Moreover, this ledger is authenticated such that a party reading data can verify that it is indeed the correct ledger (and not an imposter). Specifically, the Blockchain technology comprises a distributed database maintaining a continuously growing list of records (blocks), each of which containing a timestamp and link to a predecessor block, such that data in any given block cannot be altered retroactively without alteration of all subsequent blocks and collusion of the network majority.

One technical problem dealt with by the disclosed subject matter is to achieve near-perfect fairness in secure two-party and multi-party computation.

One technical solution is to utilize both a trusted execution platform with remote attestation, i.e. an enclave, and an authenticated public ledger, in a joint protocol of secure computation. In some exemplary embodiments, each of the parties may hold an enclave, and these enclaves may interact over an encrypted communication channel to arrive at a state where both enclaves hold a secret output, but without revealing it to the enclave owner. Each enclave may disclose the secret to its owner only after an agreed upon signal is successfully published on the authenticated public ledger (and verified by the enclave).

One technical effect of utilizing the disclosed subject matter is to provide a protocol for supporting fairness in exchanging secrets that is efficient, requires a low number of message exchanges, and achieves a negligible bias (as opposed to the alternative solutions currently available).

Another technical effect of utilizing the disclosed subject matter is to overcome known impossibility results using recent general tools (optionally realized in hardware) in order to obtain fairness. It will be appreciated that this result is due to the added (hardware or any other means) support changing the underlying model under which the impossibility was proved, by adding new functionalities thereof previously not considered or being available.

Yet another technical effect of utilizing the disclosed subject matter is to provide a building block and valuable contribution for a wide range of services that share and perform operations on data across multiple parties in a privacy preserving manner.

Figure 1:
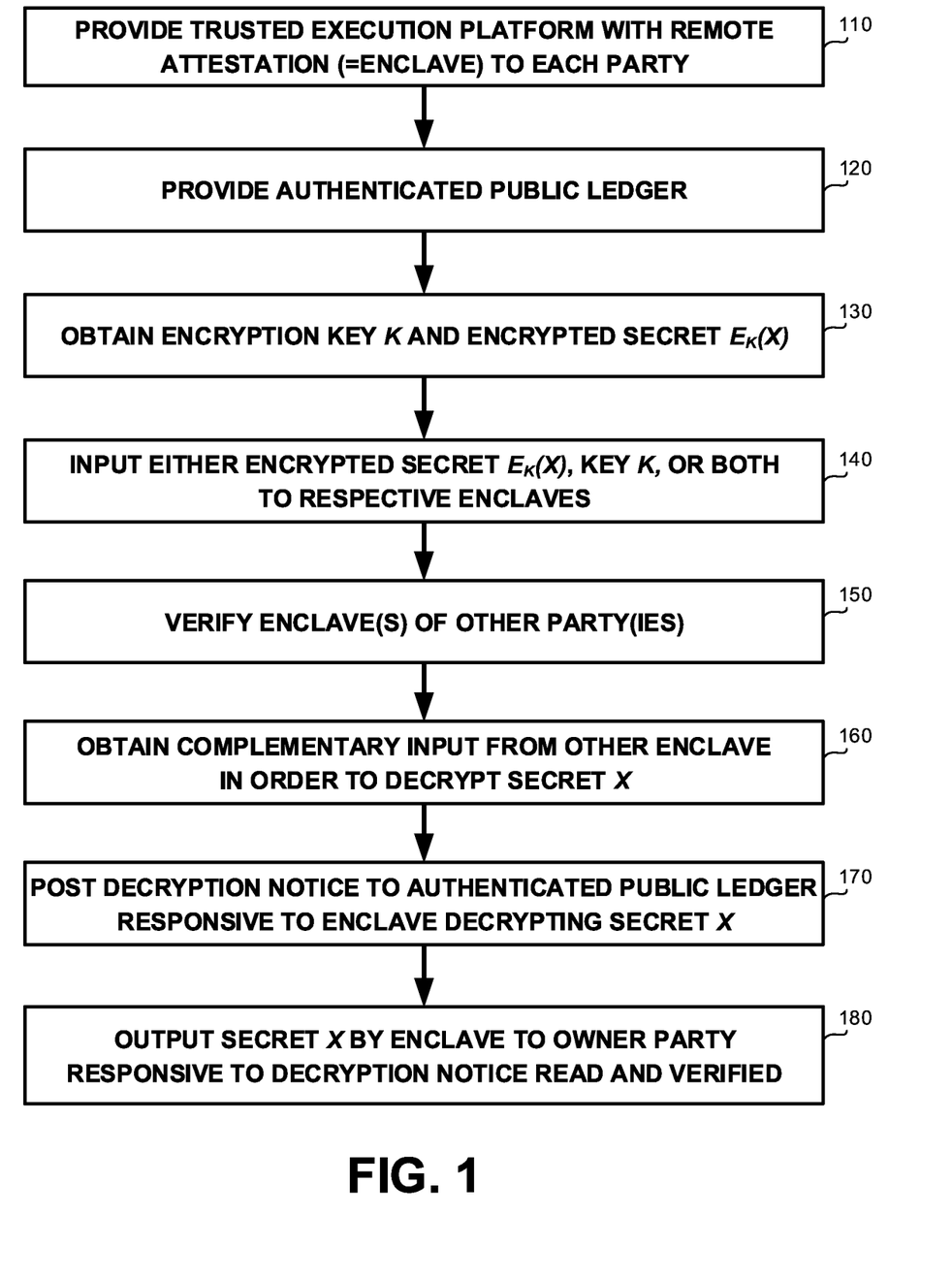
FIG. 1 shows a flowchart diagram of a method, in accordance with some exemplary embodiments of the disclosed subject matter.

Referring now to FIG. 1 showing a flowchart diagram of a method, in accordance with some exemplary embodiments of the disclosed subject matter.

On Step 110, a trusted execution platform with remote attestation (also referred to hereinafter as "enclave") may be provided to each of two or more parties participating in a secure computation protocol for joint secret output generation. The trusted execution platform may be created by the respective party, e.g. in the confinement of a computerized apparatus owned by that party, or, alternatively, at a remote host accessible by that party, optionally via a secure connection. The trusted execution platform may be configured to obtain at least a first portion and a second portion of an input to a joint secret output calculation function, such as, for example, a decryption function or likewise cryptographic computing procedure, and apply the said function on the first and second portions of the input to obtain thereby a shared secret output. The trusted execution platform may be configured to provide verification that it is genuine and operates correctly, either to any one of the other parties, or to any of their respective trusted execution platforms.

On Step 120, an authenticated public ledger may be provided, to which each of the parties or their respective enclaves may write data, or read and verify data therefrom. The authenticated public ledger may be configured in form and manner such that once data is written thereto, it cannot be later altered, e.g. deleted, augmented or otherwise modified, whether by the originator of said data or by any other third party. In some exemplary embodiments, the public ledger may be accessible to all parties and may be configured such that it cannot be disconnected or the access thereto by any of the parties denied (e.g., it may be available via the World Wide Web).

On Step 130, the first and second portions of the input to the shared secret output decryption function may be obtained, for example by means of executing a joint protocol for generation of cryptographic devices, e.g. an encryption key and data item encrypted thereby. In some exemplary embodiments, the first input portion may be an encryption key K, and the second input portion may be an encryption $E_K(X)$ of a shared secret output X that is to be distributed concurrently and simultaneously among the participating parties, wherein $E_K$ denotes an encryption function using an encryption key K, and wherein the decryption function is the inverse function of $E_K$. The decryption function may be a function admitting as input the encryption key K and the encrypted secret $E_K(X)$, and further configured for computing $X=E_K^{-1}(E_K(X),K)$. In some exemplary embodiments, the parties or their respective enclaves may run a protocol at the end of which one party has the encryption $E_K(X)$ and the other party has the key K, wherein the goal is that both parties eventually obtain the secret X, by exchanging their given information with one another, as detailed hereinafter. Additionally or alternatively, one party or their respective enclave may have both the encryption $E_K(X)$ and key K, and the other party may have only the encryption $E_K(X)$, wherein the goal would be that the latter party eventually obtain the secret X by acquiring the key K from the former party, as detailed hereinafter. Similarly, in case of multi-party settings, the encryption $E_K(X)$ and key K may be distributed among the various parties in the same manner such that only a subset thereof hold the key K, the encryption $E_K(X)$ or both, and some form of information exchange among the parties may be required to take place in order for all parties eventually obtain the shared secret output X, as detailed hereinafter.

On Step 140, the first, second or both input portions as obtained by respective participants on Step 130, may be input to their respective enclaves, where applicable. For example, the party A holding key K may input it to their owned enclave denoted as $Enclave_A$, while the other party B holding encryption $E_K(X)$ may input it to their enclave denoted as $Enclave_B$. It will be appreciated that in a case where the input generation protocol is run directly by the parties' enclaves, rather than by the parties themselves, then Step 140 may be skipped entirely.

On Step 150, verification by each enclave of the one or more other enclaves belonging to other parties may be performed. The verification may entail verifying that the enclave is genuine, as well as that it runs correctly and executes an agreed upon protocol. For example, the verification may comprise obtaining a proof that the enclave operates securely, that it is configured for computing a decryption function for extracting the shared secret output from the input portions, e.g. the encryption $E_K(X)$ and key K, that it is configured for posting a decryption notice to the authenticated public ledger following a successful decryption of the secret X, that it is configured for releasing the decrypted secret X to its respective owner party only responsive to successfully reading and verifying a decryption message posted to the authenticated public ledger provided on Step 120, or the like.

On Step 160, each enclave possessing only partial input for the decryption function, may obtain the complementary input portion from an enclave owned by another participant party in possession of the same, e.g. if only the first or second portion of the input, but not both portions, are held by a party's enclave, then in Step 160 this enclave may obtain the remainder input portion from one of the other enclaves holding the other input portion or both input portions. For example, in a two-party scenario, assuming $Enclave_A$ holds only an encryption $E_K(X)$ of a secret X as obtained using an encryption key K, while $Enclave_B$ holds only the encryption key K, then $Enclave_A$ may obtain the encryption key K from $Enclave_B$ so that it can be used by $Enclave_A$ for decrypting the encryption $E_K(X)$ and extract the secret X. Alternatively, in another exemplary setting wherein $Enclave_B$ holds both the encryption $E_K(X)$ and the key K, $Enclave_A$ may similarly obtain the key K from $Enclave_B$ in order to decrypt the secret X from the encryption $E_K(X)$. In some exemplary embodiments, the key K may be obtained by means of $Enclave_B$ posting it to the authenticated public ledger, as described herein. As can be readily understood by a person skilled in the art, the disclosed subject matter may be generalized to a multi-party scenario wherein the two input portions $E_K(X)$, K are initially distributed in some manner among the participants or the enclaves owned by them, such that eventually all enclaves are in possession of both $E_K(X)$, K without the two being revealed to any of the participants, however.

In some exemplary embodiments, the enclaves may be configured for establishing a secure communication channel between one another, over which the complementary input portion(s) can be exchanged without being leaked to any of the participants or an eavesdropper.

On Step 170, responsive to successful decryption of the secret output, an enclave may provide an indication of that fact to the authenticated public ledger, as provided on Step 120. In some exemplary embodiments, the enclave may apply a decryption function on an encryption $E_K(X)$ and key K, as obtained on either one of Steps 140 or 160. The enclave may send or post on the authenticated public ledger a decryption notice, whereby each of the enclaves can learn that the secret X has been obtained by one of the enclaves, and proceed in accordance with a predetermined course of action. In some exemplary embodiments, the decryption notice may comprise the key K itself, required for decryption of the secret X by an enclave that only possesses the encryption $E_K(X)$, as detailed herein. It will be appreciated by a person skilled in the art, that in such setting using the authenticated public ledger as distribution means of the key K, there is no need to establish a secure channel between enclaves for exchanging the complementary input portions $E_K(X)$ and K, rather it suffices that one party initially holds both of them while the remainder one or more parties hold only encryption $E_K(X)$, while the key K is obtained from the decryption notice comprising it, as posted by the party holding both input portions and using thereof to decrypt the secret X.

On Step 180, responsive to reading and verifying the decryption notice posted to the authenticated public ledger on Step 170, each of the enclaves may release to its owner party the secret output as obtained by applying the decryption function on the input portions as obtained in Step 140 and optionally in Step 160 as well, where applicable. In some exemplary embodiments, such as, for example, in a setting where the complementary input portion is provided by means of being included in the decryption notice posted to the authenticated public ledger on Step 170, then some of the preceding steps may not be performed, e.g., Step 160 may be skipped.

Figure 2:
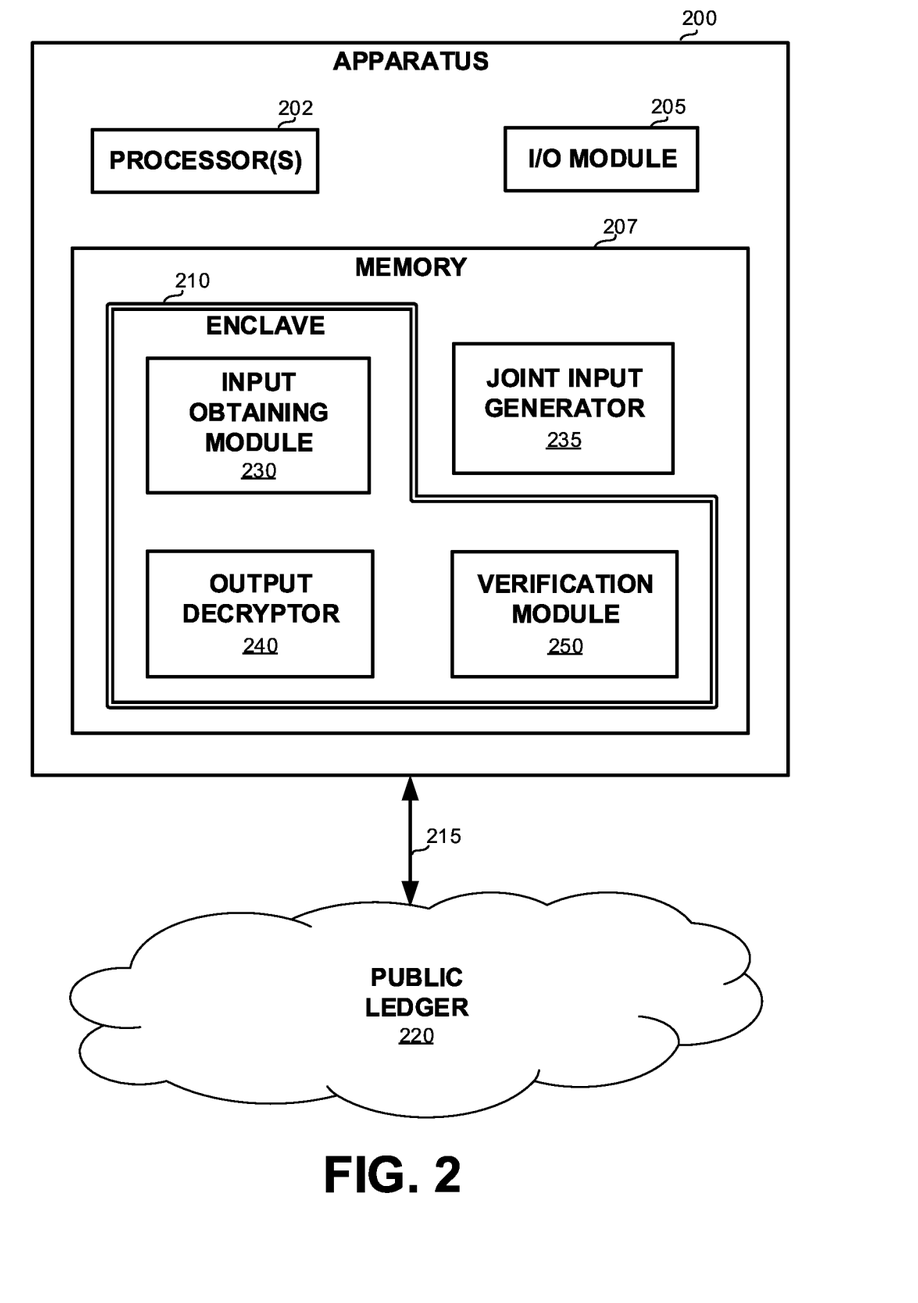
FIG. 2 shows a block diagram of an apparatus, in accordance with some exemplary embodiments of the disclosed subject matter.

Referring now to FIG. 2 showing a block diagram of an apparatus, in accordance with some exemplary embodiments of the disclosed subject matter. An Apparatus 200 may be configured to support parallel user interaction with a real world physical system and a digital representation thereof, in accordance with the disclosed subject matter.

In some exemplary embodiments, Apparatus 200 may comprise one or more Processor(s) 202. Processor 202 may be a Central Processing Unit (CPU), a microprocessor, an electronic circuit, an Integrated Circuit (IC) or the like. Processor 202 may be utilized to perform computations required by Apparatus 200 or any of it subcomponents.

In some exemplary embodiments of the disclosed subject matter, Apparatus 200 may comprise an Input/Output (I/O) module 205. I/O Module 205 may be utilized to provide an output to and receive input from a user or another Apparatus 200 being in communication therewith, such as, for example, exchanging verification data, generating joint encryption keys, encryption functions or other suitable cryptographic devices, outputting decrypted shared secret data, or the like.

In some exemplary embodiments, Apparatus 200 may comprise Memory 207. Memory 207 may be a hard disk drive, a Flash disk, a Random Access Memory (RAM), a memory chip, or the like. In some exemplary embodiments, Memory 207 may retain program code operative to cause Processor 202 to perform acts associated with any of the subcomponents of Apparatus 200.

In some exemplary embodiments, Apparatus 200 may comprise or be in communication with an Enclave 210, configured for providing functionality of a trusted execution platform with remote attestation, similarly as provided in Step 110 of FIG. 1. Enclave 210 may support secure computations, such as protected processing or storage operations. Enclave 210 may further be configured for being authenticated, such as by providing verifiable proof or credentials that it is genuine and complies with an agreed upon protocol. Enclave 210 may be any commercially or otherwise available trusted execution platform with remote attestation, such as Intel® SGX or the like. In some exemplary embodiments, Enclave 210 may be further configured to establish a secure communication channel with another Enclave 210 for exchanging information therewith without risk of it being disclosed to an owner of the Enclaves 210 or to any third parties, e.g. an eavesdropper.

In some exemplary embodiments, Apparatus 200 may be coupled or have access to an authenticated Public Ledger 220, similarly as provided in Step 120 of FIG. 1. The authenticated Public Ledger 220 may optionally be accessed by Apparatus 200 via a Communication Channel 215, such as, for example, the Internet or World Wide Web (WWW). In some exemplary embodiments, Public Ledger 220 may satisfy the following properties: it may be accessible to all parties; and, it may be configured such that it cannot be disconnected. Public Ledger 220 may further be configured in a manner to ensure that, once a message has been written it cannot be erased; and, the message will be available to any party that looks it up. In some further exemplary embodiments, Public Ledger 220 may also be authenticated or verifiable, for preventing a malicious attempt to impersonate it or the like.

In some exemplary embodiments, Enclave 210 may comprise an Input Obtaining Module 230, configured for obtaining an input to be admitted by a function for calculating a shared secret output, similarly as in Steps 140 or 160 of FIG. 1. The input may be separable into two or more portions, such that the shared secret output cannot be calculated unless all of the portions are present. For example, the input may comprise an encryption $E_K(X)$ of a secret X and a key K, wherein the function may be a decryption operation $X=E_K^{-1}(E_K(X), K)$, in accordance with a given symmetric cryptography scheme or the like. In some exemplary embodiments, Joint Input Generator 230 may initially obtain either one of the encryption $E_K(X)$, the key K, or both; wherein, in case that both are obtained, Joint Input Generator 230 may reside within Enclave 210, so as to avoid the secure computation and its fairness being compromised. In some further exemplary embodiments, in case only one of the encryption $E_K(X)$ and key K are initially obtained by Input Obtaining Module 230, it may further be configured to obtain the one or more remaining portions of the input in one or more of the manners described herein.

In some exemplary embodiments, Input Obtaining Module 230 may obtain one or more portions of the input from a Joint Input Generator 235, which may optionally reside externally to the Enclave 210. Joint Input Generator 235 may be configured to perform a procedure at the end of which the two or more different portions of the input are obtained, similarly as in Step 130 of FIG. 1. In some exemplary embodiments, Joint Input Generator 235 may be configured to cooperate with one or more other Joint Input Generator(s) (not shown) that may optionally reside in another Apparatus 200, such that at the end of the joint procedure, different portions of the input are distributed among the participating parties. For example, Joint Input Generator 235 may hold an encryption $E_K(X)$ of a secret X, while another Joint Input Generator (not shown) may hold the key K, or vice versa.

In some exemplary embodiments, Enclave 210 may comprise an Output Decryptor 240 configured to apply a predetermined function on the input obtained by Input Obtaining Module 230 in order to calculate or extract thereof the shared secret output. Thus, for example, in an illustrative setting such as discussed throughout the present disclosure, wherein the input comprising the encryption $E_K(X)$ and key K, then Output Decryptor 240 may be accordingly configured to perform the decryption operation $E_K^{-1}(E_K(X), K)$ in order to extract the secret X. In some exemplary embodiments, Output Decryptor 240 may be further configured to post a message to Public Ledger 220 responsive to successful decryption of the shared secret output, whereby providing notice to one or more other Enclave(s) 210 that Output Decryptor 240 has obtained the shared secret output, similarly as in Step 170 of FIG. 1. In some exemplary embodiments, Output Decryptor 240 may be further configured to provide along with the message posted to Public Ledger 220 the key K, e.g. by incorporating key K within the posted message or the like.

In some exemplary embodiments, Enclave 210 may comprise a Verification Module 250 configured to perform an attempted read and verification of the message posted to Public Ledger 220 by Output Decryptor 240. Verification Module 250 may be configured to release shared secret output such as obtained by Output Decryptor 240 either to a user of Apparatus 200 or to Processor(s) 202, for further computing based thereon or the like, similarly as in Step 180 of FIG. 1. In some exemplary embodiments, Verification Module 250 may be further configured to read from either Public Ledger 220 or the message posted thereto a complementary portion of the input required by Output Decryptor 240 for computing the shared secret output using the input portion as obtained by Input Obtaining Module 230. In addition, Verification Module 250 may also be configured to perform verification of another Enclave 210, to obtain assurance that the other Enclave 210 is genuine and runs correctly in accordance with a predetermined protocol, similarly as in Step 150 of FIG. 1. Alternatively, verification of other Enclave(s) 210 may be performed by another Verification Module 250 which may reside externally to Enclave 210.

Figure 3A:
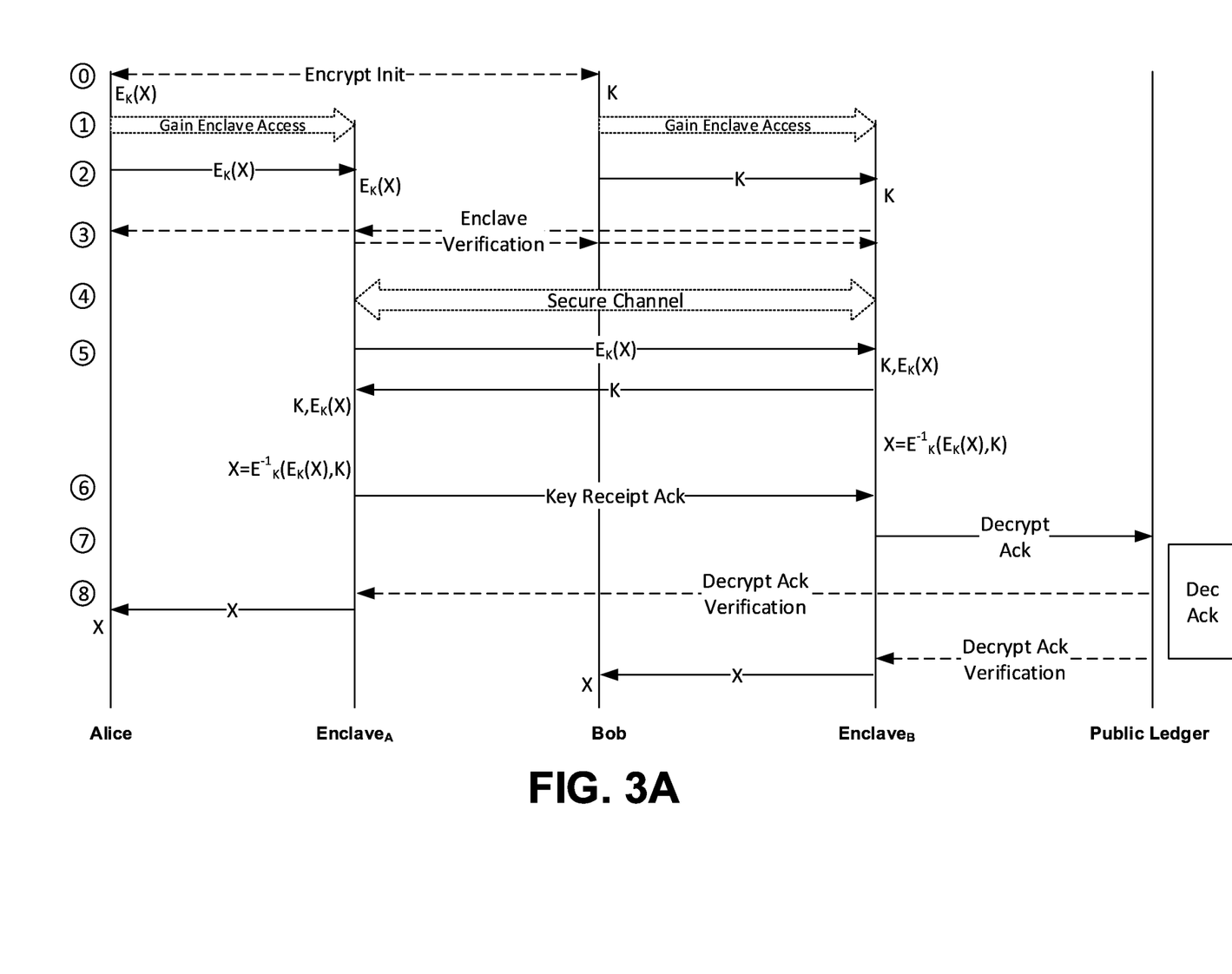
FIGS. 3A-3B show schematic illustrations of exemplary protocols for supporting fairness in secure computations, in accordance with some exemplary embodiments of the disclosed subject matter.

Referring now to FIG. 3A showing a schematic illustration of an exemplary protocol for supporting fairness in secure computations, in accordance with some exemplary embodiments of the disclosed subject matter.

In an exemplary secure computation setting illustrated in FIG. 3A, two parties, Alice and Bob, also denoted herein as A and B respectively, may run a protocol whereby one of the parties obtains an encryption $E_K(X)$ of a secret X and the other obtains the key K. The disclosed subject matter may be employed in order to achieve a desired goal state in which both parties obtain the secret X. In accordance with an exemplary embodiment of the disclosed subject matter illustrated in FIG. 3A, the protocol may be executed as follows:

0. Alice and Bob may perform an initialization step at the end of which one of the parties holds the encryption $E_K(X)$ of the secret X and the other one holds the key K, e.g., without loss of generality, Alice may hold the encryption $E_K(X)$ and Bob may hold the key K; Such an initialization step can be implemented using secure multiparty computation protocols (MPC), as explained, for example, in: Oded Goldreich, "Foundations of Cryptography: Volume 2, Basic Applications", Cambridge University Press New York, N.Y., USA 2004, at Chapter 7, which is hereby incorporated by reference in its entirety without giving rise to disavowment.
1. Alice and Bob may each create or obtain access to an enclave which may run the procedure as described below, similarly as Enclave 210 of FIG. 2. For the sake of convenience and clarity, these are denoted hereinafter by $Enclave_A$ and $Enclave_B$, respectively;
2. Without loss of generality, Alice may enter $E_K(X)$ into $Enclave_A$ and Bob may enter K into $Enclave_B$;
3. Each party may verify via remote attestation that the other party's enclave is genuine and runs the required protocol. As can be readily appreciated by a person skilled in the art, the verification that the enclaves are genuine and run correctly in accordance with the protocol may be executed either by the parties or the relative enclaves;
4. $Enclave_A$ and $Enclave_B$ may generate a secure channel between them (such as, for example, by exchanging keys and authenticating all messages). As can be readily appreciated by a person skilled in the art, information sent over the secure channel cannot be read by either Alice or Bob;
5. $Enclave_A$ and $Enclave_B$ may exchange their inputs over the secure channel, so that both have $E_K(X)$ and K and are able to decrypt and obtain the secret X;
6. $Enclave_A$ may send an acknowledgement message to $Enclave_B$ that it has received the key K therefrom and been able to successfully decrypt X;
7. Upon receiving the verification, $Enclave_B$ may post a verification message to an authenticated public ledger provided in accordance with the disclosed subject matter;
8. Each of the enclaves may attempt to read the verification message from the authenticated public ledger. Once an enclave successfully reads and authenticates the verification message of $Enclave_B$ from the authenticated public ledger, then it may release the secret X to its owner, i.e. to Alice or Bob respectfully.

As can be readily appreciated by a person skilled in the art, the procedure steps 0 to 5 may be substituted by any appropriate secure computation protocol at the end of which the two enclaves hold a shared secret X. From that stage on the protocol may continue as described herein.

Figure 3B:
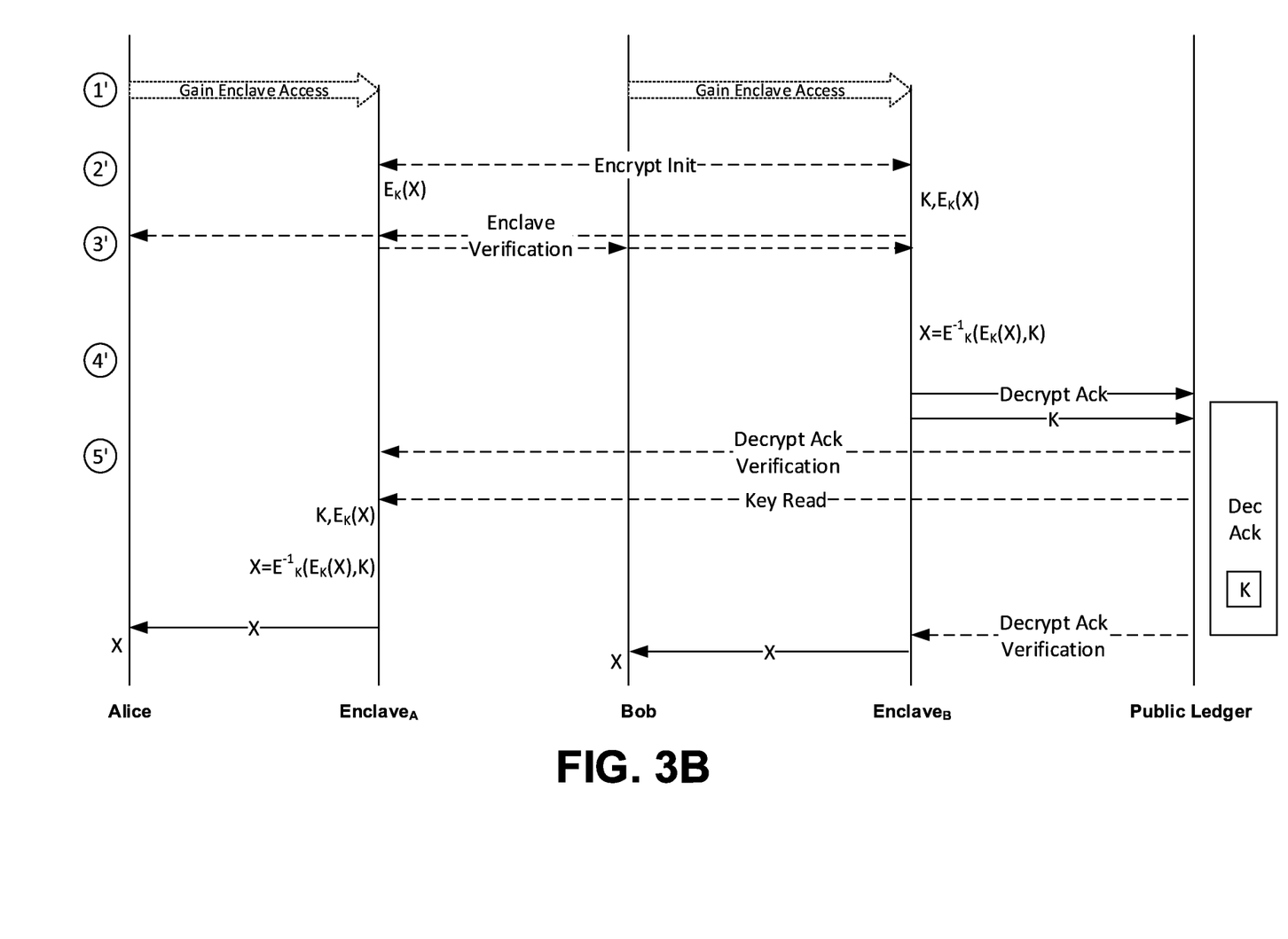

Referring now to FIG. 3B showing a schematic illustration of another exemplary protocol for supporting fairness in secure computations, in accordance with some exemplary embodiments of the disclosed subject matter.

The exemplary protocol illustrated in FIG. 3B may be run similarly to the exemplary protocol illustrated in FIG. 3A, with a few modifications thereto as described herein. Generally speaking, an alternative protocol such as depicted in FIG. 3B, may take place in a setting where following an initialization step, and without loss of generality, $Enclave_B$ holds $E_K(X)$ and K, but $Enclave_A$ only holds $E_K(X)$. In such a case the verification message posted in the ledger by $Enclave_B$ may include the key K. $Enclave_B$ may then release the secret X to Bob responsive to verifying that the message appears on the ledger. $Enclave_B$ may release X after reading K from the ledger and decrypting $E_K(X)$. As can be readily appreciated by a person skilled in the art, the alternative protocol illustrated in FIG. 3B obviates internal communication among the enclaves, and eliminates the Steps 4 to 6 of FIG. 3B or equivalents thereof. A fully detailed description of this exemplary alternative protocol is as follows:

1'. Alice and Bob may each obtain $Enclave_A$ and $Enclave_B$ respectively which may run the procedure as described below, similarly as in Step 1 of the exemplary protocol illustrated in FIG. 3A;
2'. $Enclave_A$ and $Enclave_B$ may perform an initialization step, at the end of which one of the enclaves holds both the key K and the encryption $E_K(X)$ of the secret X, and the other one holds only the encryption $E_K(X)$, e.g., without loss of generality, $Enclave_A$ may hold the encryption $E_K(X)$ and $Enclave_B$ may hold both the encryption $E_K(X)$ and the key K. As can be readily appreciated by a person skilled in the art, this step substitutes both Steps 0 and 2 of the exemplary protocol illustrated in FIG. 3A;
3'. Each party or its respective enclave may verify via remote attestation that the other party's enclave is genuine and runs the required protocol, similarly as in Step 3 of FIG. 3A. In some exemplary embodiments, this step may be performed prior to step 2'
4'. $Enclave_B$ which has $E_K(X)$ and K may decrypt and obtain the secret X and post a verification message to an authenticated public ledger provided in accordance with the disclosed subject matter, wherein the verification message may further include the key K. As can be readily appreciated by a person skilled in the art, this step is similar to Step 7 of FIG. 3A;
5'. Each of the enclaves may attempt to read from the authenticated public ledger the verification message and, where applicable, also obtain the key K comprised therein. Once an enclave successfully reads and authenticates the verification message of $Enclave_B$ from the authenticated public ledger, and, where applicable, further obtains therefrom the key K to decrypt and extract the secret X, then it may release the secret X to Alice or Bob respectfully. As can be readily appreciated by a person skilled in the art, this step is similar to Step 8 of FIG. 3A.

It will be appreciated by a person skilled in the art that, while the exemplary protocols depicted in FIGS. 3A-3B relate to settings with two parties, A and B, the disclosed subject matter is not meant to be limited in such manner, and may be utilized in settings with any arbitrary number of participating parties. In particular, any one of the exemplary protocols depicted herein can also be generalized to the multi-party case. For example, a generalized protocol may have the enclaves of all parties holding eventually both $E_K(X)$ and K and then one party may post a verification message on the ledger to signal that the secrets can be revealed locally to all parties by their respective enclaves. Additionally or alternatively, the encryption key K used to generate the encryption $E_K(X)$ of the shared secret X may be dividable to a plurality of sub-keys $K_1, \ldots, K_m$ where $1 < m \leq n$, and each of the parties or their enclaves may be provided with a different sub-key or subset of sub-keys, such that in order to decrypt the shared secret X an enclave may be required to retrieve each of the remaining sub-keys from the one or more other enclaves possessing thereof, and thereafter aggregate all the sub-keys together in order to obtain K, e.g. by performing an arithmetic operation such as summation, multiplication, modular exponentiation or the like, a logical operation such as exclusive-or (XOR), a morphological operation such as concatenation, or the like. It will be appreciated that complementing the set of sub-keys $\{K_1, \ldots, K_m\}$ can be performed in accordance with any one of the exemplary protocols such as described with respect to FIGS. 3A-3B. For example, the sub-keys may be either exchanged among the enclaves using a secure communication channel, or alternatively each of the sub-keys can be posted to the authenticated public ledger by the respective enclave to which it was distributed originally, such that once all sub-keys are attainable from the ledger, each of the enclaves may retrieve the remaining sub-keys required to reconstruct the key K, decrypt the shared secret X and reveal it to the owner party.

It will be further appreciated by a person skilled in the art that, while exemplary embodiments of the disclosed subject matter described herein relate to a decryption function admitting an encryption $E_K(X)$ of a shared secret X and a respective key K, the disclosed subject matter is not meant to be limited in such manner, and any other similarly suited shared secret schemes may be utilized therein. For example, in case of n participants, where n>1, the shared secret reconstruction by the enclaves may involve calculating coefficients of a (n−1)-degree polynomial by interpolation of n zero-crossing points distributed among the parties, as in the secret sharing scheme proposed in: A. Shamir, "How to share a secret", *Communications of the ACM,* 22 (11): 612-613 (1979), which is hereby incorporated by reference in its entirety without giving rise to disavowment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:

providing to each of a plurality of participants $P_i$ where $i=1, \ldots, n$ for $n>1$, an access to a trusted execution platform with remote attestation $E_i$, wherein each trusted execution platforms $E_i$ is configured to securely compute, in a secured region in a memory, a function for extraction of a shared secret output S, wherein the function is configured to admit an input separable into a plurality of disjoint portions $\{A_1, \ldots, A_m\}$ where $1<m\leq n$ and to emit the shared secret output S; and providing to the plurality of participants $P_i$ access to an authenticated public ledger wherein data written thereto cannot be modified thereafter, and wherein data read therefrom is verifiable with respect to being originated therein;

wherein each trusted execution platform $E_i$ is further configured to perform the steps of: each trusted execution platform $E_i$ obtaining a subset $\{A_j, \ldots, A_k\}$ of the plurality of disjoint portions $\{A_1, \ldots, A_m\}$ of input to the function of the each trusted execution platform $E_i$, wherein the subset being non-empty, wherein $1\leq j\leq k\leq m$;

obtaining a complementary subset consisted of a remaining portion or portions $\{A_1, \ldots, A_m\}\backslash\{A_j, \ldots, A_k\}$ of input to the function from one or more of other trusted execution platforms $\{E_j\}_{j\neq i}$, whereby extraction of the shared secret output S can be effected by means of applying the function on a plurality of input portions $\{A_1, \ldots, A_m\}$ obtained; and, responsive to obtaining and verifying an indication from the authenticated public ledger that extraction of the shared secret output S can be effected by each of the trusted execution platforms $\{E_i\}_{i=1, \ldots, n}$, providing the extracted shared secret output S to respective participant $P_i$;

wherein at least one of the trusted execution platforms $\{E_i\}_{i=1, \ldots, n}$ is further configured to provide the indication to the authenticated public ledger responsive to obtaining knowledge that extraction of the shared secret output S can be effected by each of the trusted execution platforms $\{E_i\}_{i=1, \ldots, n}$.

2. The computer-implemented method of claim 1, wherein the trusted execution platforms $\{E_i\}_{i=1, \ldots, n}$ are able to securely exchange communications with one another, wherein said obtaining the complementary subset from the one or more other trusted execution platforms $\{E_j\}_{j\neq i}$ is performed by means of communicating over a secure channel established therewith.

3. The computer-implemented method of claim 2, wherein the trusted execution platform $E_i$ is further configured for providing the indication to the authenticated public ledger responsive to receiving over the secure communication channel an indication from each of the other trusted execution platforms $\{E_i\}_{j\neq i}$ that extraction of the shared secret output S can be effected thereby.

4. The computer-implemented method of claim 1, wherein said obtaining the subset is performed by means of each trusted execution platform $E_i$ receiving the subset from the respective participant $P_i$.

5. The computer-implemented method of claim 1, wherein the input portion $A_1$ is an encryption of S using an encryption key K and an encryption function $E_K(\ )$ wherein the encryption key K is obtainable from the remaining one or more input portions $\{A_2, \ldots, A_m\}$ when aggregated together, wherein the function is a corresponding decryption function $E_K^{-1}(E_K(S), K)$.

6. The computer-implemented method of claim 1, wherein each trusted execution platform $E_i$ is further configured to provide verifiable indication of being genuine and correctly running according to a predetermined protocol.

7. The computer-implemented method of claim 1, wherein said obtaining the complementary subset from one or more of the other trusted execution platforms $\{E_j\}_{j \neq i}$ is performed using the authenticated public ledger, wherein at least one of the other trusted execution platforms $\{E_j\}_{j \neq i}$ is further configured for providing to the authenticated public ledger one or more members of the subset, whereby enabling a remainder of the trusted execution platforms obtaining thereof, wherein providing to the authenticated public ledger the indication is performed responsive to determining that for each of the trusted execution platforms $\{E_i\}_{i=1, \ldots, n}$ the complementary subset required thereto is obtainable from the authenticated public ledger.

8. The computer-implemented method of claim 1, wherein the authenticated public ledger is configured in a manner such that access thereto cannot be denied from any one of the plurality of participants.

9. The computer-implemented method of claim 1, wherein the subset obtained by each one of the trusted execution platforms $\{E_i\}_{i=1, \ldots, n}$ is distinct, such that said obtaining the complementary subset requires obtaining from each of the other trusted execution platforms $\{E_j\}_{j \neq i}$ the respective subset obtained thereby.

10. A computerized apparatus comprising a hardware processor, the processor being adapted to perform the steps of:
providing to each of a plurality of participants $P_i$ where $i=1, \ldots, n$ for $n>1$, an access to a trusted execution platform with remote attestation $E_i$, each trusted execution platforms $E_i$ is configured to securely compute, in a secured region in a memory, a function for extraction of a shared secret output S wherein the function is configured to admit input separable into a plurality of disjoint portions $\{A_1, \ldots, A_m\}$ where $1 < m \leq n$ and to emit the shared secret output S; and
providing to the plurality of participants $P_i$ access to an authenticated public ledger wherein data written thereto cannot be modified thereafter, and wherein data read therefrom is verifiable with respect to being originated therein;
wherein each trusted execution platform $E_i$ is further configured to perform the steps of:
obtaining a subset $\{A_j, \ldots, A_k\}$ of the plurality of disjoint portions $\{A_1, \ldots, A_m\}$ of input to the function of the each trusted execution platform $E_i$, the subset being non-empty, wherein $1 \leq j \leq k \leq m$;
obtaining a complementary subset consisted of a remaining portion or portions $\{A_1, \ldots, A_n\} \setminus \{A_j, \ldots, A_k\}$ of input to the function from one or more of the other trusted execution platforms $\{E_j\}_{j \neq i}$, whereby extraction of the shared secret output S can be effected by means of applying the function on a plurality of input portions $\{A_1, \ldots, A_m\}$ obtained; and,
responsive to obtaining and verifying an indication from the authenticated public ledger that extraction of the shared secret output S can be effected by each of the trusted execution platforms $\{E_i\}_{i=1, \ldots, n}$, providing the extracted shared secret output S to respective participant $P_i$;
wherein at least one of the trusted execution platforms $\{E_i\}_{i=1, \ldots, n}$ is further configured to provide the indication to the authenticated public ledger responsive to obtaining knowledge that extraction of the shared secret output S can be effected by each of the trusted execution platforms $\{E_i\}_{i=1, \ldots, n}$.

11. The computerized apparatus of claim 10, wherein the trusted execution platforms $\{E_i\}_{i=1, \ldots, n}$ are able to securely exchange communications with one another, wherein said obtaining the complementary subset from the one or more other trusted execution platforms $\{E_j\}_{j \neq i}$ is performed by means of communicating over a secure channel established therewith.

12. The computerized apparatus of claim 11, wherein the trusted execution platform $E_i$ is further configured for providing the indication to the authenticated public ledger responsive to receiving over the secure communication channel an indication from each of the other trusted execution platforms $\{E_j\}_{j \neq i}$ that extraction of the shared secret output S can be effected thereby.

13. The computerized apparatus of claim 10, wherein said obtaining the subset is performed by means of each trusted execution platform $E_i$ receiving the subset from the respective participant $P_i$.

14. The computerized apparatus of claim 10, wherein the input portion $A_1$ is an encryption of S using an encryption key K and an encryption function $E_K(\ )$ wherein the encryption key K is obtainable from the remaining one or more input portions $\{A_2, \ldots, A_m\}$ when aggregated together, wherein the function is a corresponding decryption function $E_K^{-1}(E_K(S), K)$.

15. The computerized apparatus of claim 10, wherein each trusted execution platform $E_i$ is further configured to provide verifiable indication of being genuine and correctly running according to a predetermined protocol.

16. The computerized apparatus of claim 10, wherein said obtaining the complementary subset from one or more of the other trusted execution platforms $\{E_j\}_{j \neq i}$ is performed using the authenticated public ledger, wherein at least one of the other trusted execution platforms $\{E_j\}_{j \neq i}$ is further configured for providing to the authenticated public ledger one or more members of the subset, whereby enabling a remainder of the trusted execution platforms obtaining thereof, wherein providing to the authenticated public ledger the indication is performed responsive to determining that for each of the trusted execution platforms $\{E_i\}_{i=1, \ldots, n}$ the complementary subset required thereto is obtainable from the authenticated public ledger.

17. The computerized apparatus of claim 10, wherein the authenticated public ledger is configured in a manner such that access thereto cannot be denied from any one of the plurality of participants.

18. The computerized apparatus of claim 10, wherein the subset obtained by each one of the trusted execution platforms $\{E_i\}_{i=1, \ldots, n}$ is distinct, such that said obtaining the complementary subset requires obtaining from each of the other trusted execution platforms $\{E_j\}_{j \neq i}$ the respective subset obtained thereby.

19. A computer program product comprising a non-transitory computer readable storage medium retaining program instructions, which program instructions when read by a processor, cause the processor to perform a method comprising:
providing to each of a plurality of participants $P_i$ where $i=1, \ldots, n$ for $n>1$, an access to a trusted execution platform with remote attestation $E_i$, wherein each trusted execution platforms $E_1$ is configured to securely compute, in a secured region in a memory, a function for extraction of a shared secret output S, wherein the function is configured to admit input separable into a plurality of disjoint portions $\{A_1, \ldots, A_m\}$ where $1 < m \leq n$ and to emit the shared secret output S; and providing to the plurality of participants $P_i$ access to an authenticated public ledger wherein data written thereto cannot be modified thereafter, and wherein data read therefrom is verifiable with respect to being originated therein;

wherein each trusted execution platform $E_i$ is further configured to perform the steps of:

obtaining a subset $\{A_j, \ldots, A_k\}$ of the plurality of disjoint portions $\{A_1, \ldots, A_m\}$ of input to the function of the each trusted execution platform $E_i$, wherein the subset being non-empty, wherein $1 \leq j \leq k \leq m$;

obtaining a complementary subset consisted of a remaining portion or portions $\{A_1, \ldots, A_m\} \setminus \{A_{i1}, \ldots, A_{ik}\}$ of input to the function from one or more of the other trusted execution platforms $\{E_j\}_{j \neq i}$, whereby extraction of the shared secret output S can be effected by means of applying the function on a plurality of input portions $\{A_1, \ldots, A_m\}$ obtained; and, responsive to obtaining and verifying an indication from the authenticated public ledger that extraction of the shared secret output S can be effected by each of the trusted execution platforms $\{E_i\}_{i=1,\ldots,n}$, providing the extracted shared secret output S to respective participant $P_i$;

wherein at least one of the trusted execution platforms $\{E_i\}_{i=1,\ldots,n}$ is further configured to provide the indication to the authenticated public ledger responsive to obtaining knowledge that extraction of the shared secret output S can be effected by each of the trusted execution platforms $\{E_i\}_{i=1,\ldots,n}$.

* * * * *